United States Patent
Fleming et al.

(10) Patent No.: US 10,762,284 B2
(45) Date of Patent: Sep. 1, 2020

(54) AUTOMATED SUMMARIZATION OF DIGITAL CONTENT FOR DELIVERY TO MOBILE DEVICES

(71) Applicant: International Business Machines Corporation, Armonk, NY (US)

(72) Inventors: Kala Fleming, Nairobi (KE); Sally Simone R. F. L. Fobi Nsutezo, New York, NY (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/682,122

(22) Filed: Aug. 21, 2017

(65) Prior Publication Data
US 2019/0057071 A1    Feb. 21, 2019

(51) Int. Cl.
*H04L 12/801*    (2013.01)
*G06F 40/169*    (2020.01)
(Continued)

(52) U.S. Cl.
CPC .......... *G06F 40/169* (2020.01); *G06F 3/0488* (2013.01); *G06F 15/0291* (2013.01); *H04L 47/10* (2013.01); *H04L 47/12* (2013.01); *H04L 67/327* (2013.01); *H04N 21/00* (2013.01); *H04N 21/41407* (2013.01); *H04N 21/4436* (2013.01); *H04N 21/64761* (2013.01); *H04N 21/6582* (2013.01); *H04N 21/8549* (2013.01); *G06F 16/739* (2019.01); *H04L 65/60* (2013.01); *H04L 65/601* (2013.01); *H04L 65/80* (2013.01);
(Continued)

(58) Field of Classification Search
CPC .. G06F 17/241; G06F 3/0488; G06F 15/0291; H04N 21/00
See application file for complete search history.

(56) References Cited

U.S. PATENT DOCUMENTS 5,978,381 A * 11/1999 Perlman .................. H04L 29/06
                                                                370/432
6,751,776 B1 * 6/2004 Gong ..................... G06F 16/739
                                                                715/203
(Continued)

FOREIGN PATENT DOCUMENTS

EP          1706807 B1    9/2009
WO     2009009166 A1    1/2009

OTHER PUBLICATIONS

BRCK Education, Kio Kit "The Digital Classroom," https://www.brck.com/education/.
(Continued)

*Primary Examiner* — Richard Z Zhu
(74) *Attorney, Agent, or Firm* — Udi Einhorn; Ryan, Mason & Lewis, LLP

(57) ABSTRACT

One or more factors associated with consuming digital content on at least one device associated with at least one user are assessed. One or more ameliorative actions for consuming the digital content are performed based on the assessment. Performing the one or more ameliorative actions comprises delivering a summarization of the digital content to the at least one device based on the assessment.

20 Claims, 5 Drawing Sheets

(51) Int. Cl.
  *G06F 15/02*      (2006.01)
  *G06F 3/0488*     (2013.01)
  *H04N 21/658*     (2011.01)
  *H04N 21/443*     (2011.01)
  *H04N 21/647*     (2011.01)
  *H04N 21/414*     (2011.01)
  *H04N 21/8549*    (2011.01)
  *H04N 21/00*      (2011.01)
  *H04L 29/08*      (2006.01)
  *H04N 21/442*     (2011.01)
  *H04L 29/06*      (2006.01)
  *H04N 21/2343*    (2011.01)
  *G06F 16/738*     (2019.01)
  *H04N 21/262*     (2011.01)

(52) U.S. Cl.
  CPC ... *H04N 21/2343* (2013.01); *H04N 21/23439* (2013.01); *H04N 21/26216* (2013.01); *H04N 21/44209* (2013.01)

(56) References Cited

U.S. PATENT DOCUMENTS

| | | | | |
|---|---|---|---|---|
| 6,771,268 | B1* | 8/2004 | Crinon | G06F 16/7847 345/475 |
| 7,131,059 | B2* | 10/2006 | Obrador | G11B 27/031 715/209 |
| 7,451,395 | B2 | 11/2008 | Brants et al. | |
| 7,607,083 | B2 | 10/2009 | Gong et al. | |
| 8,272,020 | B2* | 9/2012 | Watson | H04L 65/60 725/96 |
| 8,903,407 | B2* | 12/2014 | Chmaytelli | H04L 47/25 455/450 |
| 10,057,618 | B2* | 8/2018 | Drouin | H04N 21/4755 |
| 10,404,772 | B2* | 9/2019 | Lee | H04L 67/02 |
| 2002/0186241 | A1* | 12/2002 | Kohda | G09G 5/00 715/744 |
| 2004/0128308 | A1* | 7/2004 | Obrador | G06F 16/4393 |
| 2004/0170321 | A1* | 9/2004 | Gong | G06F 16/785 382/173 |
| 2005/0164681 | A1* | 7/2005 | Jenkins | H04M 1/7255 455/412.1 |
| 2006/0264197 | A1* | 11/2006 | Mahini | H04M 1/72522 455/343.5 |
| 2009/0103889 | A1* | 4/2009 | Stone | H04N 19/00 386/241 |
| 2011/0038611 | A1* | 2/2011 | Gianutsos | G06Q 30/0607 386/279 |
| 2012/0079062 | A1 | 3/2012 | Fonseca, Jr. et al. | |
| 2016/0142794 | A1* | 5/2016 | Yoo | H04N 21/4394 386/282 |
| 2017/0242554 | A1* | 8/2017 | Nanjunda Iyer | G06F 16/739 |
| 2018/0075139 | A1* | 3/2018 | Sadovsky | G06F 17/2229 |

OTHER PUBLICATIONS

"Lithium Ion battery pack, Lithium ion cell, Li Ion cell, Li ion battery, protection circuit pcm," http://www.ibt-power.com/Battery_packs/Li_Ion/Lithium_ion_tech.html, Aug. 25, 2017, 6 pages.

* cited by examiner

100

200

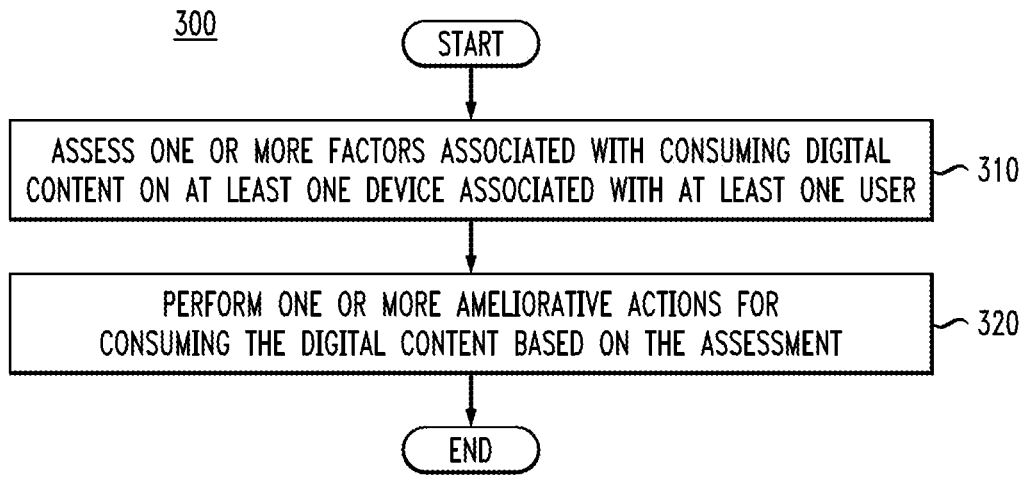
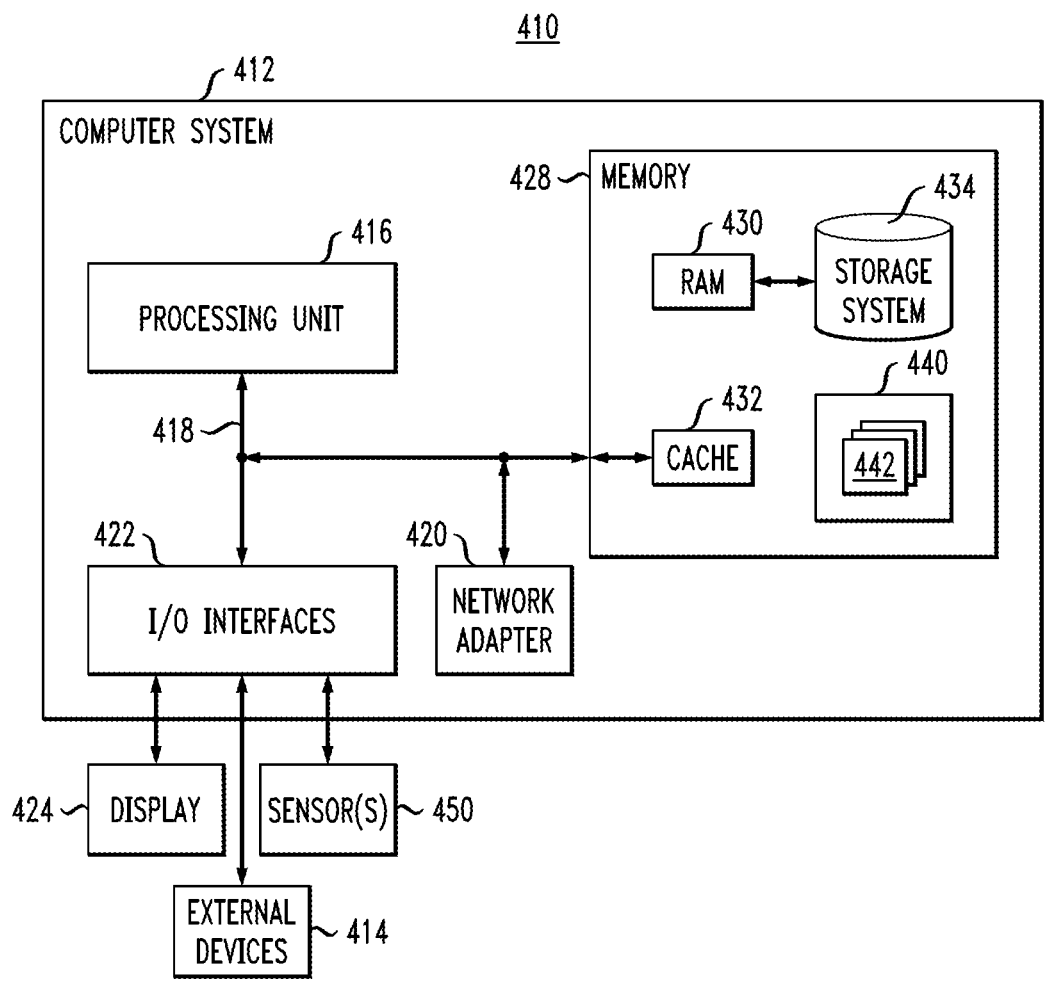

AUTOMATED SUMMARIZATION OF DIGITAL CONTENT FOR DELIVERY TO MOBILE DEVICES

BACKGROUND

The proliferation of mobile technology and other social factors have been attributed to the rapid increase in content digitization and creation. Examples of digital content include, but are not limited to, electronic books ("e-books"), multimedia resources, music, games, etc. Digital content creation may be driven by a variety of means, such as learning technologies, library services, news, communication and entertainment services. Additionally, digital content creation may be driven by desires to be more environmentally conscious, such as reducing the use of printed materials (e.g., newspaper articles).

SUMMARY

Embodiments of the present invention relate to techniques for generating summarizations of digital content.

For example, in one embodiment, an apparatus to generate a summarization of digital content comprises at least one processing device operatively coupled to a memory and configured to assess one or more factors associated with consuming digital content on at least one device associated with at least one user, and perform one or more ameliorative actions for consuming the digital content based on the assessment. In performing the one or more ameliorative actions, the at least one processor is configured to deliver a summarization of the digital content based on the assessment.

For example, in another embodiment, a method for generating a summarization of digital content comprises assessing one or more factors associated with consuming digital content on at least one device associated with at least one user, and performing one or more ameliorative actions for consuming the digital content based on the assessment. Performing the one or more ameliorative actions comprises delivering a summarization of the digital content to the at least one device based on the assessment. The steps are implemented by at least one processing device comprising a processor operatively coupled to memory.

For example, in yet another embodiment, an article of manufacture for generating a summarization of digital content comprises a processor-readable storage medium for storing processor-readable program code which, when executed, causes a processor to implement the steps of: assessing one or more factors associated with consuming digital content on at least one device associated with at least one user, and performing one or more ameliorative actions for consuming the digital content based on the assessment. Performing the one or more ameliorative actions comprises delivering a summarization of the digital content to the at least one device based on the assessment.

BRIEF DESCRIPTION OF THE DRAWINGS

FIG. 3 depicts a flowchart illustrating a process for providing summarizations of digital content, according to an embodiment of the present invention.

FIG. 4 depicts a computer system in accordance with which one or more components/steps of techniques of the invention may be implemented, according to an embodiment of the invention.

DETAILED DESCRIPTION

Devices, such as mobile devices (e.g., smartphones and tablets), have become integral devices for many people around the world in order to communicate with others and consume digital content. Mobile devices may comprise various sensors, such as cameras, touch sensors, accelerometers, gyroscopes, microphones, compasses, global positioning satellite (GPS), etc. The presence of these sensors may enable the development of sensing applications relevant to a variety of fields, including but not limited to healthcare, transportation and agriculture. Service delivery and data collection via mobile device sensors, such as in the education and marketing fields, may provide a cheap and scalable approach for providing individuals with access to information and content without requiring massive infrastructure. Sensor application deployment and usage may be highly dependent on mobile device resources, such as battery life, storage, bandwidth, etc. The battery life of a mobile device, for example, may be influenced by factors such as an energy penalty of each sensor, a polling frequency of each sensor and the deployment architecture of the sensors in the mobile device.

For instance, in one exemplary scenario, a user may have important information to download to a mobile device prior to a business meeting. The information may, for example, be embodied as digital content (e.g. digital content found in an e-mail). The mobile device may encounter a resource constrained situation (due to intermittent connectivity, bandwidth, time, battery power, etc.) in time T, where T is less than a total estimated time that the user has in order to download and consume the digital content. Thus, in such a time-sensitive situation, the user may prefer to download and consume a summarization of the digital content. Illustrative embodiments described herein allow for the rapid and efficient summarization of digital content by analyzing one or more factors that may affect the ability of the mobile device, or the consumer of the digital content, from being able to download and consume the original digital content.

Figure 1:
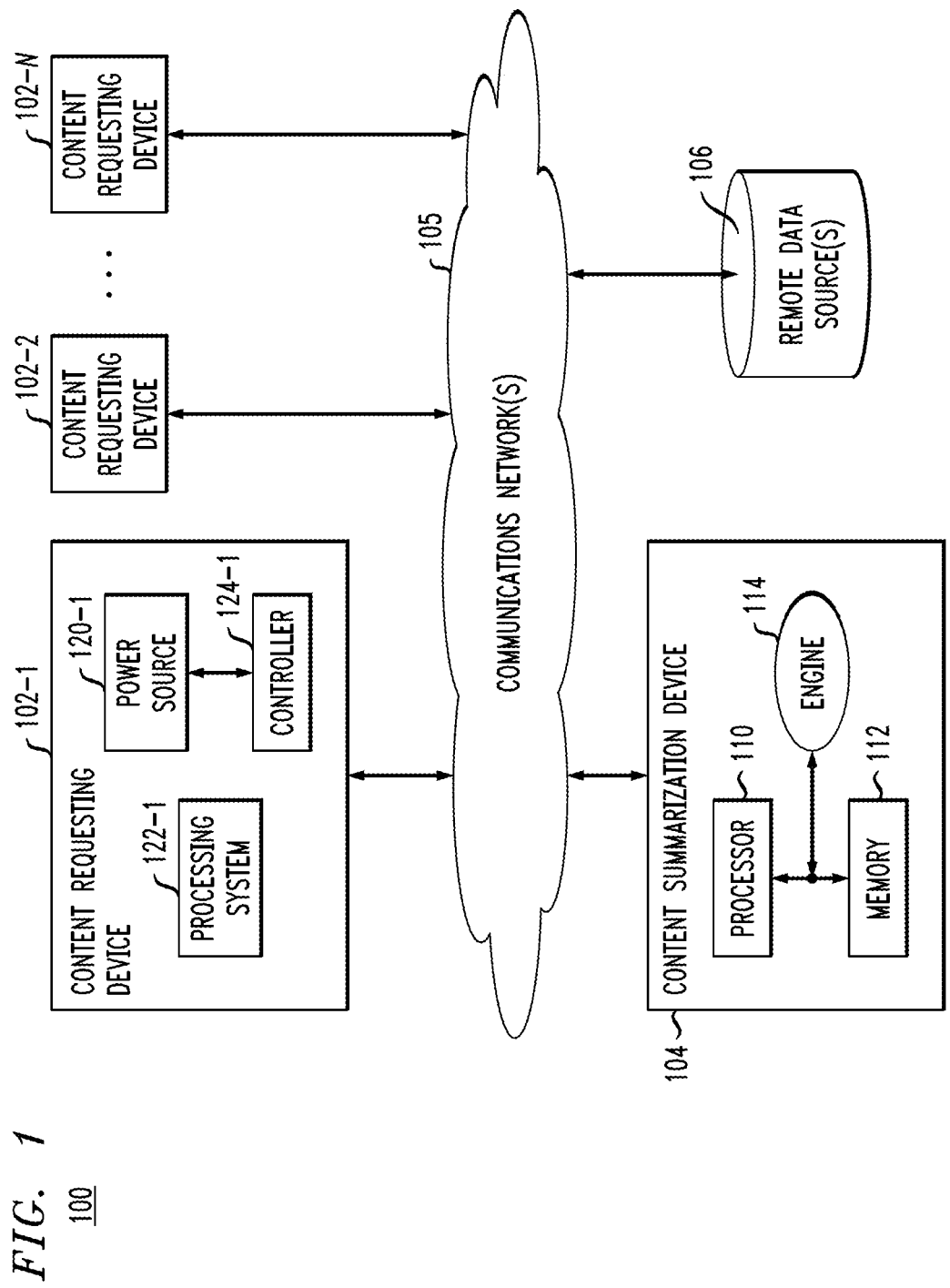
FIG. 1 depicts a block diagram of a system to provide summarizations of digital content, according to an embodiment of the present invention.

FIG. 1 shows an exemplary system 100 configured to provide summarizations of digital content. System 100 may include one or more devices, shown in FIG. 1 as content requesting devices 102-1, 102-2, . . . , 102-N, content summarization device 104, and one or more remote data sources 106 connected over at least one communications network 105. Content requesting devices 102-1 through 102-N may comprise one or more mobile devices, such as smartphones, tablets, etc., and may each be associated with one or more users.

Content request device 102-1 may request digital content for consumption. The digital content may include one or more of text content, audio content and video content. For example, the digital content may include one or more of documents, e-mails, e-books, music, multimedia, games, etc. that may be consumed on content request device 102-1. The digital content may be requested by content requesting device 102-1 from remote data source(s) 106. Remote data source(s) 106 may comprise one or more remote data sources associated with one or more content-provider companies.

Content requesting device 102-1 may comprise power source 120-1, processing system 122-1 for processing digital content received over communications network(s) 105 and controller 124-1. Power source 120-1 may comprise a battery power source.

Content summarization device 104 is configured to collect data from various sources for use in various analytics relating to the summarization of digital content. Content summarization device 104 is shown comprising at least one processor 110 operatively coupled to memory 112 and content summarization engine ("engine") 114. In one embodiment, content summarization device 104 is comprised in a server, such as a cloud-based server. However, content summarization device 104 may be comprised in any processing device configured to implement the embodiments described herein. Additionally, content summarization device 104 may itself be a collection of multiple processing devices. For example, engine 114, which will be described in further detail below, may be provided by different servers or other processing devices in one or more clouds. In addition, it is to be appreciated that embodiments do not require use of clouds or cloud-based servers.

Engine 114 is configured to assess one or more factors associated with consuming the content on content requesting device 102-1 in order to determine if an ameliorative action is required for consuming the content. The one or more factors may comprise at least one of one or more constraints associated with resources of content requesting device 102-1, one or more cohorts associated with the user of content requesting device 102-1, and a risk associated with conveying the content. The one or more factors may further include an importance factor associated with conveying the content. Further details regarding the one or more factors will now be discussed.

Resources of content requesting device 102-1 may include one or more of connectivity, storage, bandwidth, time and power (e.g., power of power source 120-1), and examples of resource constraints may include low power, low communication bandwidth, error-prone communication, low memory, etc.

The one or more cohorts associated with the user of content requesting device 102-1 may describe one or more characteristics of the user that may be pertinent in summarizing content for the user. For example, the one or more cohorts may comprise one or more of job category, educational level, cognitive state associated with the user and condition associated with the user. The cognitive state associated with the user may include a distracted state, a nervous state, etc. The condition associated with the user may include a learning impairment, which may be helpful in creating digital content summarizations tailored to the user in an educational setting.

The risk of conveying the digital content may be based at least in part on the one or more resource constraints (e.g., if content requesting device 102-1 is likely to die within 15 seconds). The risk may be assessed in a variety of ways. For example, one or more mathematical functions may be employed that take one or more parameters. Examples of such parameters include, but are not limited to, battery charge, battery rate of discharge, predicted rate of discharge, current and forecasted network bandwidth, information on challenges of accessing content (e.g., if three individuals are currently experiencing slow downloads, the risk of slow download may increase for another individual), current and forecasted weather (e.g., a storm that is currently leading to, or may lead to, degraded download speeds or risk of losing power), etc. Each of these parameters may be weighted. For example, a parameter may have a respective weight applied to it based on whether the parameter previously had a significant effect.

For example, the computation of risk (R) associated with conveying digital content may include determining resource constraint level (RC) of content requesting device 102-1 by monitoring the current usage of ongoing and planned activities associated with content requesting device 102-1 from a plurality of applications and device sensors (due to intermittent connectivity, bandwidth, time, battery power, etc.), predicting downloading (PD) of digital content (e.g., content found in an e-mail) on content requesting device 102-1 based on historical user activities (e.g., download history associated with user events such as meeting, presentation, location searching, electronic calendar, etc.), computing an importance level (L) of digital content associated with user context (e.g., meeting in one hour), determining an estimated time for downloading and consuming digital content (ΔT) based on the monitored ongoing and planned activities associated with content requesting device 102-1. In one embodiment, the value R is compared to a threshold (e.g., a minimum threshold), and the content summarization process is triggered if is determined that R is below the threshold.

In one embodiment, as discussed above, an importance factor associated with conveying the digital content may be incorporated into the assessment. The importance factor may be used in order to determine what portions of the digital content are most important or valuable, and thus what portions of the digital content should be included in the summarization. Many different types of information associated with importance may be used. For example, the importance may be based on the cohort and information on the user receiving the information (among other factors). Additionally, an importance value may be associated with chunks of the digital content (e.g., a textual or media presentation). For example, a chunk of data from the digital content may be tagged as important or given an importance rating based on the content of the chunk, or importance can be inferred from download statistics. Thus, in order to save resources such as bandwidth and battery power, content requesting device 102-1 may then choose to either not download, or download at a lower bandwidth, those chunks determined to be relatively unimportant. Feedback can be received and machine learning techniques may be implemented to update the importance of a chunk.

In one embodiment, engine 114 is configured to assess the one or more resource constraints by calculating a score associated with an amount of resources available for content requesting device 102-1 to trigger the content summarization. The score may be computed by determining, for example, one or more of the resources currently in use, an estimated number of the resources required for any planned activities and a history of resource status of content requesting device 102-1. The score may be computed as a function of at least a portion of the input parameters discussed above in the context of risk assessment. For example, the score may be computed as a function of current and forecasted network bandwidth. Additionally, each input may be weighted. For example, if the bandwidth is decreasing and the battery discharge rate is increasing, a score may be computed that suggests a download is at risk and that a summarization of the digital content may be required.

Prior to computing the resource status of content requesting device 102-1, data associated with a current state of content requesting device 102-1, such as battery status, connectivity status, storage status, etc., may be collected. For example, the collection of such data may determine that content requesting device 102-1 has 10% battery remaining, 1.5 gigabytes of storage remaining, 11 applications and/or services running that are consuming 40% of CPU and 47% of bandwidth, etc. Techniques for collecting data associated with a current state of content requesting device 102-1 are known in the art, and further details regarding the implementation of such techniques will not be provided herein. This instrumentation of resources may also instrument activities of each individual running applications or processes, sensors and context information. Information on activities and/or processes running on content requesting device 102-1 may be used to estimate the time for which the current resources may last.

Figure 2:
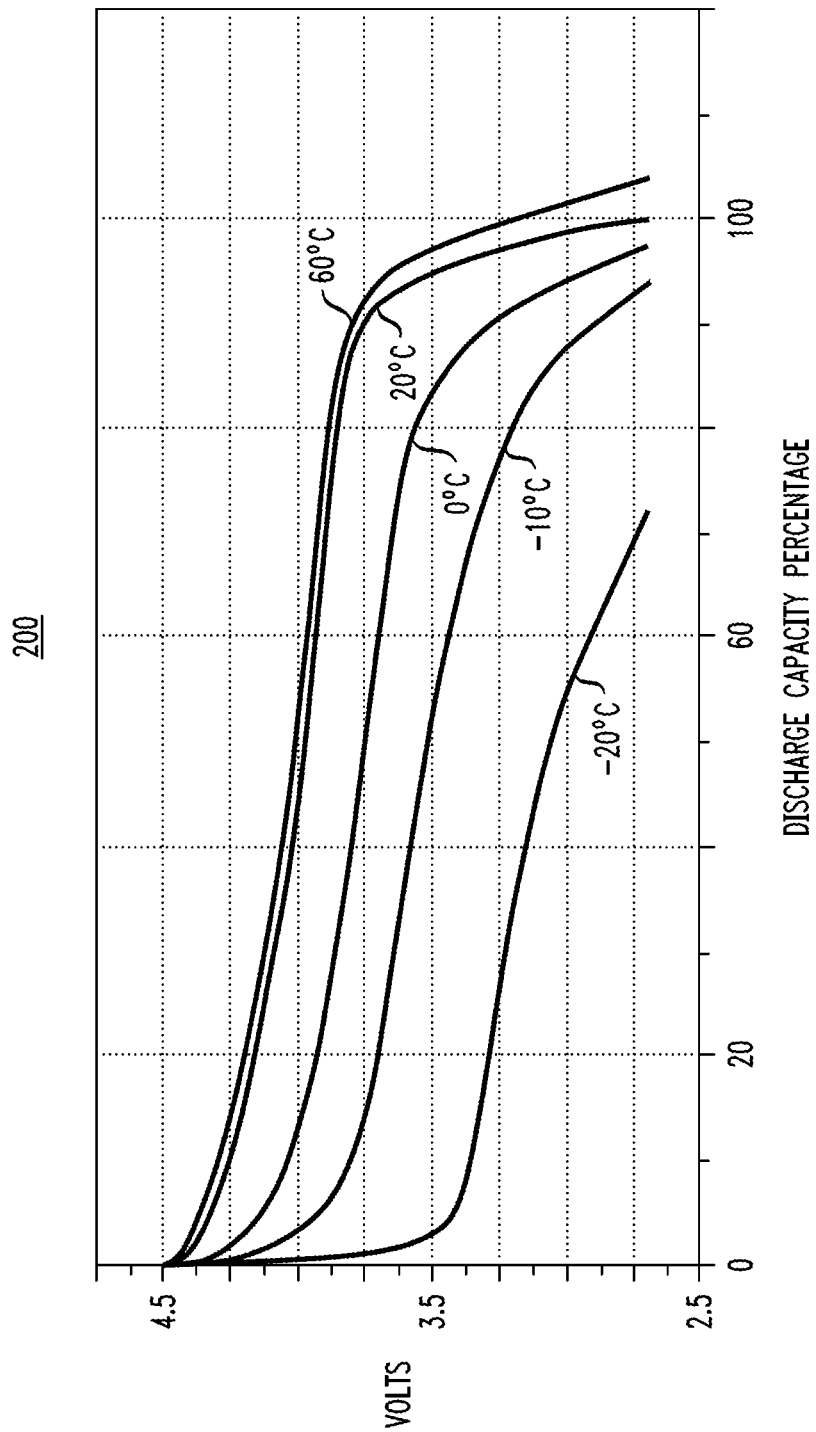
FIG. 2 depicts a constraint forecast graph, according to an embodiment of the present invention.

In one embodiment, the one or more resource constraints may be based at least in part on a constraint forecast for predicting future resource conditions. For example, the constraint forecast may predict future resource conditions for the next N seconds. Such forecasts may take into account ambient temperature, which may have an effect on battery charge life, and data associated with previous conditions at different times of the day in order to forecast external resource conditions, such as bandwidth. FIG. 2 depicts an exemplary constraint forecast graph 200 that illustrates a forecast of the effect of ambient temperature on power source life (e.g., battery source life).

Referring back to FIG. 1, in assessing the one or more resource constraints, a computation or estimation of the resources required by content requesting device 102-1 to download and/or store the digital content, such as from remote data source 106, is performed, and a computation or estimation of remaining resources currently available to content requesting device 102-1 is performed. For example, the power needed to download the desired digital content and the remaining power currently available to content requesting device 102-1 may be computed or estimated. These two computations or estimates may be compared and, if the computed or estimated resources required to download and/or store the digital content via content requesting device 102-1 is within a predetermined value to the computed or estimated remaining resources currently available to content requesting device 102-1, a warning may be generated that device 102-1 may be unable to download and/or store the digital content with the current available resources. An exemplary method for determining resources required by a mobile device to download digital content is disclosed by U.S. patent application publication No. 2006/0264197.

Content requesting device 102-1 may be configured to optimize power consumption during the processing of digital content by processing system 122-1. For example, in one embodiment, controller 124-1 is configured to determine a remaining capacity of power source 120-1 and receive information from a content provider (e.g., from remote data source(s) 106) about available delivery parameters for digital content. Based on the remaining capacity of power source 120-1 and the available delivery parameters, controller 124-1 may be configured to determine an operation duration for content requesting device 102-1, and send a request to the content provider selecting at least one delivery parameter for delivery of the digital content. The selection of the at least one delivery parameter may be performed automatically, or may be performed manually via the user. An exemplary system for optimizing device power consumption is disclosed by European Patent No. EP1706807.

Engine 114 may be configured to perform one or more ameliorative actions for consuming the digital content based on the assessment. For example, if the digital content is an article, the summarization for the article may include a three sentence summary of the article. As another example, if the digital content is a song or video, a snippet or important portion of the song or video may be delivered. In one embodiment, engine 114 is further configured to perform the one or more ameliorative actions by delivering the summarization in a medium different from that of the digital content. For example, if the digital content comprises text content, the summarization may be delivered as audio content.

The one or more ameliorative actions may include delivering a summarization of the digital content. The summarization may be delivered to one or more devices, such as content requesting device 102-1. In one embodiment, the task of summarization or downloading may be transferred to another device, such as content requesting device 102-2, by notifying the user via an alert comprising one or more of voice command, vibration, blinking, changing color, etc.

In one embodiment, the delivery of the digital content summarization may be triggered based on a function of at least the one or more resource constraints, the risk associated with conveying the digital content and the user cohort. The importance information may also be incorporated within the function. In the embodiment in which the one or more resource constraints may be based on a constraint forecast, the triggering of the delivery of the summarization may be based on a function of the one or more resource constraints, the risk associated with conveying the content, the user cohort and an ambient temperature history and forecast.

For example, in a scenario in which content requesting device 102-1 is determined to not have enough battery power to download and/or store the digital content itself, the delivery of the digital content summarization may be triggered in order for the user to consume at least the digital content summarization before content requesting device 102-1 runs out of power. In another exemplary scenario, content requesting device 102-1 may have sufficient power and memory to accommodate the consumption of the original digital content, but obtaining the digital content may be adversely affected by low connectivity or bandwidth. That is, due to acute (real-time or near real-time) connectivity, content requesting device 102-1 may not be able to download content of a particular size (X) in an amount of time ($T_1$), with the acute connectivity continuing for an amount of time $T_2$ greater than time $T_1$. In this scenario, engine 114 may be configured to compute size X that can be downloaded under time $T_1$. Then, the digital content summarization delivery process may be initiated based on such information and the one or more factors. The summarization process may look into local storage for similar content, which may be delivered to content requesting device 102-1 along with the digital content summarization. Additionally or alternatively, engine 114 may apply content similarity algorithms on the local storage and deliver the digital content summarization to the user. For example, prior to downloading content from remote data source(s) 106 for summarization, engine 114 may first apply content similarity algorithms on local device cache or storage to fetch digital content that may be similar to the digital content needed to be delivered to content request device 102-1. This step may advantageously decrease the estimated time for downloading and consuming digital content ($\Delta T$).

In order to deliver the digital content summarization to content requesting device 102-1, engine 114 may be configured to generate the digital content summarization automatically, in real-time or near real-time, via machine-generation. Alternatively, one or more versions of summarizations of the digital content may have been previously generated and stored, and a version of the digital content summarization determined to be most suitable based on the one or more factors may be obtained from a data source, such as from remote data source(s) 106. For instance, system 100 may be configured to allow entities, such as content-provider companies, teachers, parents, supervisors, etc., to store multiple versions of digital content summarizations based on risk level, resource degradation, user cohort, etc. That is, multiple versions of digital content summarizations may be stored for a variety of scenarios that would trigger the delivery of a digital content summarization in a particular context. In one embodiment, engine 114 may receive information from a content provider about available summaries that are pre-stored for rapid delivery.

In one embodiment, content requesting device 102-1 is configured to determine a desired quality of the digital content and/or digital content summarization, and download the digital content and/or digital content summarization with the desired quality.

The nature of a digital content summarization (e.g., sophistication of vocabulary used to summarize the digital content) may be tailored to the one or more cohorts of the user. For example, in the case of education, a digital content summarization may be personalized for each student. The digital content summarization for a given student may be based on, for example, the given student's preferences, style, engagement, performance, grade level, cognitive state, and any learning impairment that the given student may have. Additionally, the downloading and/or the summarizing of the digital content may be prioritized based on a lecture plan (i.e., the next day's lesson over the next week's lesson).

The system of FIG. 1 may employ text summarizing techniques that utilize relevance measurement technologies and latent semantic analysis techniques in order to provide accurate and useful digital content summarizations of text documents. Generic text summaries may be produced by ranking and extracting sentences from original documents. Broad coverage of document content and decreased redundancy may simultaneously be achieved by constructing summaries from sentences that are highly ranked and different from each other. Exemplary text summarizing techniques are known in the art, and a further description of such text summarizing techniques will not be provided herein.

The system of FIG. 1 may employ video content summarization techniques that are configured to create personalized multimedia summaries based on a user-specified theme. Natural language processing and video analysis techniques may be used to extract important keywords from closed caption text, as well as prominent visual features from video footage. A statistical framework, such as a Bayesian statistical framework, may be used to naturally integrate the user theme, the heuristics and the theme-relevant video characteristics within a unified platform. Exemplary video content summarization techniques are known in the art, and a further description of such video content summarization techniques will not be provided herein.

Advantageously, the illustrative embodiments described herein identify a portion of digital content that conveys the main concept or topic of the digital content to determine overall summarized content, such as by analyzing importance information, and then tailor the overall summarized content in a manner that meets the needs of an individual user, such as user device resource constraints, a risk in conveying the digital content, and one or more user cohorts.

With reference to FIG. 3, flow chart 300 is provided illustrating a process for providing summarizations of digital content.

At step 310, one or more factors associated with consuming digital content on a device associated with a user are assessed. The one or more factors may comprise one or more constraints associated with one or more resources of the device. Examples of resources of the device include connectivity, storage, bandwidth, time, battery power, etc. In one embodiment, assessing the one or more constraints comprises calculating a score associated with an amount of resource available for the at least one device to download the digital content. Calculating the score may comprise determining one or more of the resources currently in use, an estimated number of the resources required for any planned activities, and a status history of the one or more resources. The constraints may be determined based on a constraint forecast for predicting future resource conditions.

The one or more factors may further comprise a risk associated with conveying the digital content. In one embodiment, the risk is assessed based at least in part on the one or more resource constraints. The one or more factors may further comprise one or more cohorts associated with the user. Examples of cohorts associated with the user include job category, educational level, cognitive state associated with the user, condition associated with the user, etc. In one embodiment, the one or more factors further comprise an importance factor associated with at least a portion of the digital content.

At step 320, one or more ameliorative actions for consuming the digital content are performed based on the assessment. Performing the one or more ameliorative actions comprises delivering a summarization of the digital content based on the assessment. The summarization may be delivered into a medium different from that of the digital content. For example, if the digital content comprises text content, the summarization may be delivered as audio content. In one embodiment, assessing the one or more factors at step 310 comprises computing an output of a function of the one or more factors, and the summarization is delivered at step 320 based on the output.

Further details regarding steps 310 and 320 of the process of FIG. 3 are provided above with reference to FIGS. 1 and 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, sensor(s) 450, etc., one or more devices that enable a user to interact with computer system/server 412, and/or any devices (e.g., network card, modem, etc.) that enable computer system/server 412 to communicate with one or more other computing devices. Such communication can occur via I/O interfaces 422. Still yet, computer system/server 412 can communicate with one or more networks such as a LAN, a general WAN, and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
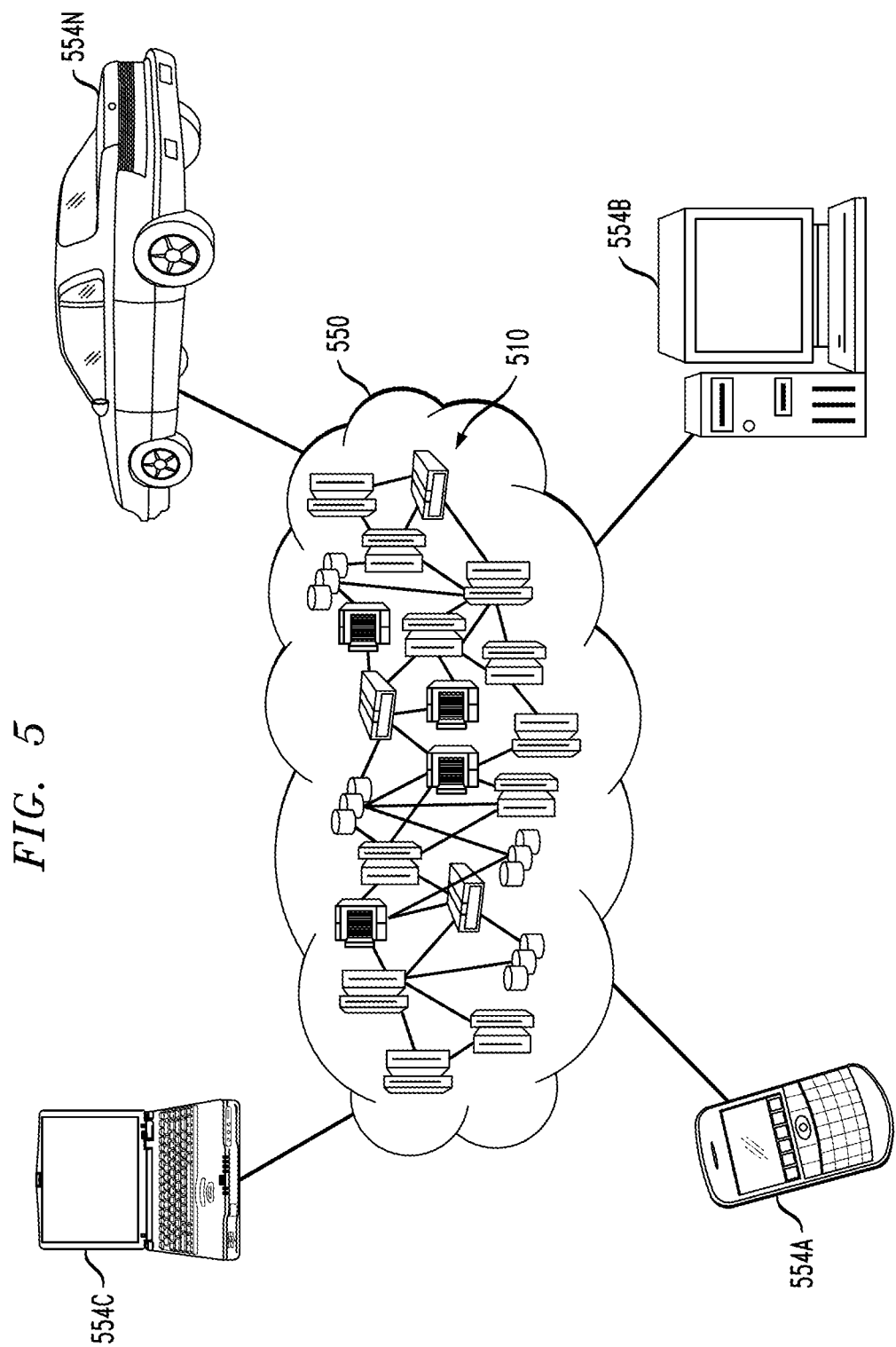
FIG. 5 depicts a cloud computing environment, according to an embodiment of the present invention.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
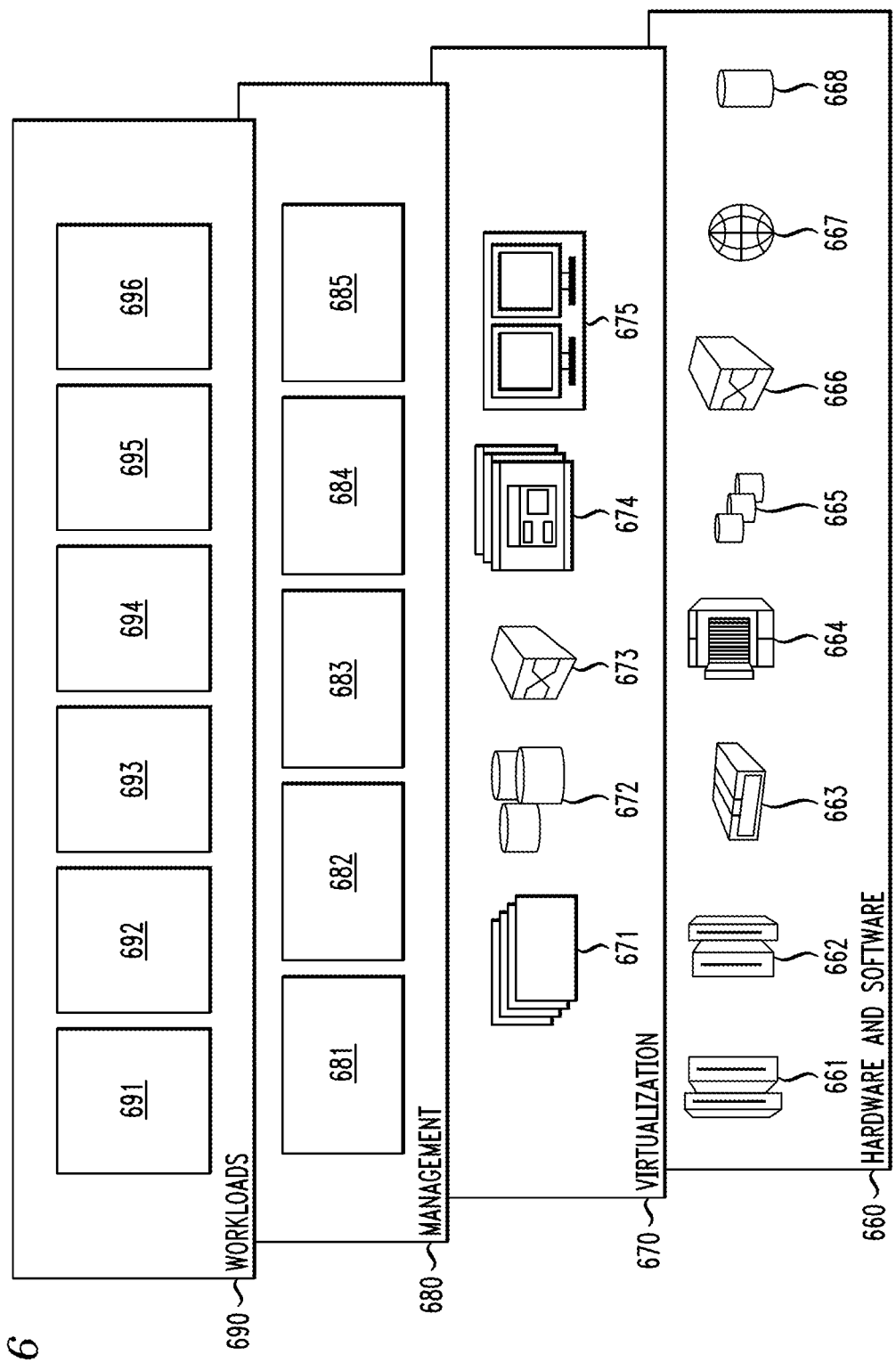
FIG. 6 depicts abstraction model layers, according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: device resource management 691; software development and lifecycle management 692; data capturing 693; data analytics processing 694; factor assessment 695; and ameliorative action performance 696, which may perform one or more of the functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
   at least one processor operatively coupled to a memory and configured to:
   collect data from one or more sources and perform analytics relating to summarization of digital content of the data;
   receive a request from at least one device associated with at least one user for digital content;
   assess one or more factors associated with consuming digital content on the at least one device, the one or more factors comprising one or more of constraints associated with one or more resources of the at least one device and one or more cohorts associated with the at least one user;

compute a measure of risk associated with conveying the digital content to the at least one device, the computing a measure of risk comprising determining a resource constraint level based on the assessment of an affect the one or more constraints will have on an ability of the at least one device to consume the digital content; and perform one or more ameliorative actions for consuming the digital content if it is determined that the measure of risk is unfavorable relative to a defined threshold;

wherein the one or more ameliorative actions comprises delivering a summarization of the digital content to the at least one device based on the assessment;

wherein delivering the summarization further comprises evaluating at least one parameter associated with the one or more resources of the at least one device; and wherein the summarization is selectively generated in accordance with the at least one parameter.

2. The apparatus of claim 1, wherein the digital content comprises one or more of text content, audio content and video content.

3. The apparatus of claim 1, wherein:

the one or more resources comprise one or more of connectivity, storage, bandwidth, time and battery power; and the one or more cohorts comprise one or more of job category, educational level, cognitive state, and condition associated with the at least one user;

wherein delivering the summarization includes selectively tailoring the summarization in conjunction with the at least one parameter of the one or more resources of the at least one device and the one or more cohorts of the at least one user.

4. The apparatus of claim 3, wherein the one or more factors further comprise an importance factor associated with at least a portion of the digital content.

5. The apparatus of claim 3, wherein computing the measure of risk comprises a calculation of a score associated with an amount of resources available for the at least one device to download the digital content, and wherein the calculation of the score comprises a determination of one or more of the resources currently in use, an estimated number of the resources required for any planned activities, and a status history of the one or more resources.

6. The apparatus of claim 1, wherein the assessment of the one or more factors comprises a computation of an output of a function of the one or more factors, and wherein the summarization is delivered based on the output.

7. The apparatus of claim 1, wherein the at least one device comprises at least one mobile device.

8. The apparatus of claim 1, wherein the one or more ameliorative actions comprises delivering the summarization of the digital content in a medium different from the digital content.

9. The apparatus of claim 1, wherein the summarization is delivered to a second device and wherein an alert is generated at the at least one device notifying the at least one user of the delivery to the second device.

10. A method comprising:

collecting data from one or more sources and performing analytics relating to summarization of digital content of the data;

receiving a request from at least one device associated with at least one user for digital content;

assessing one or more factors associated with consuming digital content on the at least one device, the one or more factors comprising one or more of constraints associated with one or more resources of the at least one device and one or more cohorts associated with the at least one user;

computing a measure of risk associated with conveying the digital content to the at least one device, the computing a measure of risk comprising determining a resource constraint level based on the assessment of an affect the one or more constraints will have on an ability of the at least one device to consume the digital content; and performing one or more ameliorative actions for consuming the digital content if it is determined that the measure of risk is unfavorable relative to a defined threshold;

wherein the one or more ameliorative actions comprises delivering a summarization of the digital content to the at least one device based on the assessment;

wherein delivering the summarization further comprises evaluating at least one parameter associated with the one or more resources of the at least one device;

wherein the summarization is selectively generated in accordance with the at least one parameter; and wherein the steps of the method are implemented by at least one processing device comprising a processor operatively coupled to memory.

11. The method of claim 10, wherein the digital content comprises one or more of text content, audio content and video content.

12. The method of claim 10, wherein the one or more factors further comprise an importance factor associated with at least a portion of the digital content.

13. The method of claim 10, wherein the one or more resources comprise one or more of connectivity, storage, bandwidth, time and battery power;

wherein delivering the summarization includes selectively structuring the summarization in conjunction with the at least one parameter of the one or more resources of the at least one device.

14. The method of claim 13, wherein:

the one or more cohorts comprise one or more of job category, educational level, cognitive state associated with the at least one user, and condition associated with the at least one user;

wherein delivering the summarization includes selectively tailoring the summarization in conjunction with the one or more cohorts of the at least one user.

15. The method of claim 10, wherein assessing the one or more factors comprises calculating a score associated with an amount of resources available for the at least one device to download the digital content.

16. The method of claim 15, wherein calculating the score comprises determining one or more of the resources currently in use, an estimated number of the resources required for any planned activities, and a status history of the one or more resources.

17. The method of claim 10, wherein the one or more constraints are determined based on a constraint forecast for predicting future resource conditions.

18. The method of claim 10, wherein assessing the one or more factors comprises computing an output of a function of the one or more factors, and wherein the summarization is delivered based on the output.

19. The method of claim 8, wherein performing the one or more ameliorative actions further comprises delivering the summarization in a medium different from a medium of the digital content.

20. An article of manufacture comprising a non-transitory computer readable storage medium for storing processor-readable program code which, when executed, causes a processor to perform the steps of:

collecting data from one or more sources and perform analytics relating to summarization of digital content of the data;

receiving a request from at least one device associated with at least one user for digital content;

assessing one or more factors associated with consuming digital content on the at least one device, the one or more factors comprising one or more of constraints associated with one or more resources of the at least one device and one or more cohorts associated with the at least one user;

computing a measure of risk associated with conveying the digital content to the at least one device, the computing a measure of risk comprising determining a resource constraint level based on the assessment of an affect the one or more constraints will have on an ability of the at least one device to consume the digital content; and performing one or more ameliorative actions for consuming the digital content if it is determined that the measure of risk is unfavorable relative to a defined threshold;

wherein the one or more ameliorative actions comprises delivering a summarization of the digital content to the at least one device based on the assessment;

wherein delivering the summarization further comprises evaluating at least one parameter associated with the one or more resources of the at least one device; and wherein the summarization is selectively generated in accordance with the at least one parameter.

\* \* \* \* \*